United States Patent Office 2,850,472
Patented Sept. 2, 1958

2,850,472

COLOR STABILIZED ACRYLONITRILE POLYMERS AND METHOD OF MAKING THE SAME

Lloyd T. Jenkins and Charles H. Campbell, Decatur, Ala., assignors to The Chemstrand Corporation, Decatur, Ala., a corporation of Delaware No Drawing. Application December 17, 1956
Serial No. 628,533

20 Claims. (Cl. 260—32.6)

This invention relates to the stabilization of acrylonitrile polymers and blends thereof. More particularly, it relates to the stabilization of acrylonitrile polymers and blends thereof which have a tendency to develop color upon standing or application of heat.

The term "polymer," as employed in the instant description and claims, is intended to include homopolymers, copolymers, and blends thereof, said polymers containing at least 80 percent by weight of polymerized or copolymerized acrylonitrile in the polymer molecule.

Acrylonitrile polymers containing 80 percent or more of acrylonitrile are generally insoluble in the more common solvents. In those instances where suitable solvents have been found, in order to effect solution, the application of heat is usually necessary. Where heat is employed to effect solutions, from which shaped articles are to be formed, a tan to dark brown color frequently develops in the solutions and therefore is carried over into the product formed therefrom. This color also develops in solutions upon standing for prolonged periods of time.

The mechanism which causes color formation has not been definitely ascertained, although a variety of reasons therefor have been advanced. The presence of metal ions, such as iron, copper and manganese in the solutions may cause the color. The employment of amide compounds as solvents may result in formation of amines when heat is applied and cause color in the compositions. Impurities present in the solvents have also been cited as a cause. Whatever may be the reason for color formation, it results in compositions and products of undesirable standards and therefore, has been the source of concern, particularly in commercial operations where such types of polymers or coplymers are employed.

Accordingly, it is an object of the present invention to prevent undesirable color formation in acrylonitrile polymer compositions.

Another object is to minimize color formation when solutions of the acrylonitrile polymers are permitted to stand for a prolonged period of time or upon application of heat.

It is also an object of the invention to prevent color formation in acrylonitrile polymers at elevated temperatures.

A still further object of the invention is the production of solutions of acrylonitrile polymers and articles produced therefrom having improved color characteristics.

Other objects and advantages will be apparent from a consideration of the description of the invention which follows hereafter.

In general, the objects of the invention are accomplished by dissolving the polymer of acrylonitrile in a suitable solvent therefor and preventing or minimizing color formation in the solution as an inhibiting agent, a combined reagent comprising an organic metal sulfoxylate and a compound selected from the group consisting of benzene phosphonous acid and benzene phosphonic acid.

Among the sulfoxylates which may be employed in practising the instant invention are those having the general formula,

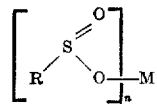

in which R is an alkanol group containing 1 to 3 carbon atoms, an acyl group containing 1 to 3 carbon atoms or an aryl group containing 6 to 8 carbon atoms, n is an integer from 1 to 2, and M is sodium, potassium, zinc, etc. Compounds illustrative of this class are sodium formaldehyde sulfoxylate, zinc formaldehyde sulfoxylate, potassium formaldehyde sulfoxylate, zinc acetaldehyde sulfoxylate, sodium acetaldehyde sulfoxylate, potassium acetaldehyde sulfoxylate, zinc propionaldehyde sulfoxylate, sodium propionaldehyde sulfoxylate, potassium propionaldehyde sulfoxylate, etc.

The components of the inhibiting agent may be employed in equal or unequal amounts, any one constituent being present in a range of from 99 to 1 percent in a two component system. The total amount of inhibiting agent may be employed in a range of about 0.3 to 15 percent, based on the total polymer weight. However, it is preferred that the inhibiting agent of the instant invention be present in a small amount compared to the amount of polymer dissolved. Thus, although the amount is not critical, it is preferred that the inhibiting agent be present in the amount of about 0.3 to 3 percent, based on the total weight of the polymer. The inhibiting agent may be added to the solvents before or after the polymer is dissolved therein. The inhibiting agent permits exposure to high temperatures for prolonged standing periods without the development of the objectionable color which usually results in such solutions. The compositions of the instant invention may be prepared in a varying temperature range. For example, the compositions of the instant invention may be prepared by mixing the polymer, a suitable solvent and the inhibiting agent at any temperature or heating the mixture to a temperature up to the boiling point of the solvent.

Among the solvents which may be used in practising the instant invention are N,N-dimethylformamide, N,N-dimethylacetamide, aqueous zinc chloride, sulfuric acid, aqueous nitric acid, aqueous sodium thiocyanate, ethylene carbonate, sulfolane, nitromethane, etc.

The polymeric materials, which may be employed in the practice of the present invention, are polyacrylonitrile, copolymers, including binary and ternary polymers containing at least 80 percent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least 80 percent by weight. While the preferred polymers employed in the instant invention are those containing at least 80 percent of acrylonitrile, generally recognized as the fiber-forming acrylonitrile polymers, it will be understood that the invention is likewise applicable to polymers containing less than 80 percent acrylonitrile and the same stability is realized with the inhibiting agents defined herein. The acrylonitrile polymers containing less than 80 percent acrylonitrile are useful in forming films, coating compositions, molding operations, lacquers, etc., in all of which applications the alleviation of undesirable color is extremely important.

For example, the polymer may be a copolymer of from 80 to 98 percent acrylonitrile and from 2 to 20 percent of another monomer containing the $>C=C<$ linkage and copolymerizable with acrylonitrile. Suitable monoolefinic monomers include acrylic, alpha-chloroacrylic and methacrylic acids; the acrylates, such as methyl-methacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinyl pyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other >C=C< containing polymerizable materials.

The polymer may be a ternary interpolymer, for example, products obtained by the interpolymerization of acrylonitrile and two or more of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 97 percent of acrylonitrile, from 1 to 10 percent of a vinylpyridine or a 1-vinylimidazole, and from 1 to 18 percent of another substance, such as methacrylonitrile or vinyl chloride.

The polymer may also be a blend of polyacrylonitrile or of a binary interpolymer of from 80 to 99 percent acrylonitrile and from 1 to 20 percent of at least one other >C=C< containing substance with from 2 to 50 percent of the weight of the blend of a copolymer of from 10 to 70 percent of acrylonitrile and from 30 to 90 percent of at least one other >C=C< containing polymerizable monomer. Preferably, when the polymeric material comprises a blend, it will be a blend of a copolymer of 90 to 98 percent acrylonitrile and from 2 to 10 percent of another mono-olefinic monomer, such as vinyl acetate, which is not receptive to dyestuff, with a sufficient amount of a copolymer of from 10 to 70 percent of acrylonitrile and from 30 to 90 percent of a vinyl-substituted tertiary heterocyclic amine, such as vinylpyridine or 1-vinylimidazole, to give a dyeable blend having an overall vinyl-substituted tertiary heterocyclic amine content of from 2 to 10 percent, based on the weight of the blend.

The polymers, useful in the practice of the present invention, may be prepared by any conventional polymerization procedure, such as mass polymerization methods, solution polymerization methods, or aqueous emulsion procedures. However, the preferred practice utilizes suspension polymerization wherein the polymer is prepared in finely divided form for immediate use in the fiber fabrication operations. The preferred suspension polymerization may utilize batch procedures, wherein monomers are charged with an aqueous medium containing the necessary catalyst and dispersing agents. A more desirable method involves the semi-continuous procedure in which the polymerization reactor containing the aqueous medium is charged with the desired monomers and the continuous withdrawal of polymer may also be employed.

The polymerization is catalyzed by means of any water-soluble peroxy compound, for example the potassium, ammonium and other water-soluble salts of peroxy acids, sodium peroxide, hydrogen peroxide, sodium perborate, the sodium salts of other peroxy acids, and any other water-soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as salts of triethanolamine and dodecylmethylamine, salts of rosin acids and mixtures thereof, the water-soluble salts of half esters of sulfuric acid and long chain aliphatic alcohols, sulfonated hydrocarbons, such as alkyl aryl sulfonates, and any other of a wide variety of wetting agents, which are in general organic compounds containing both hydrophobic and hydrophilic radicals. The quantity of emulsifying agents will depent upon the particular agents selected, the ratio of monomer to be used, and the conditions of polymerization. In general, however, from 0.01 to 1.0 percent by weight of the monomers may be employed.

The emulsion polymerizations are preferably conducted in glass or glass-lined vessels which are provided with a means for agitating the contents. Generally, rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated, is within the province of one skilled in the art. The articles manufactured therefrom may be produced by well-known conventional methods, for example, the wet-spinning, dry-spinning and melt-spinning methods for producing fibers.

The following examples are illustrative rather than limitative and all parts, proportions and percentages are by weight unless otherwise specified.

EXAMPLE I 7.5 grams of a polymer blend of 88 percent of a copolymer containing 94 percent of acrylonitrile and 6 percent of vinyl acetate and 12 percent of a copolymer of 50 percent of acrylonitrile and 50 percent of 2-methyl-5-vinyl pyridine were added to 45 milliliters of N,N-dimethylacetamide containing approximately 0.05 gram of titanium dioxide. The mixture was stirred and heated to 70° C. It was then quickly cooled to room temperature and the color measured. This sample was used as a control. The purity is set forth below. Subsequently, like samples were prepared but with 0.150 gram of a color inhibitor containing 0.075 gram each of zinc formaldehyde sulfoxylate and benzene phosphonous acid; and 0.150 gram of a color inhibitor containing 0.075 gram each of zinc formaldehyde sulfoxylate and benzene phosphonic acid. The purity is set forth below.

*Table I*

| Inhibitor | Percentage used | Purity |
| --- | --- | --- |
| Control | | 11.6 |
| Zinc formaldehyde sulfoxylate and benzene phosphonous acid | 2 | 4.4 |
| Zinc formaldehyde sulfoxylate and benzene phosphonic acid | 2 | 5.1 |

EXAMPLE II 7.5 grams of a copolymer containing 94 percent of acrylonitrile and 6 percent of vinyl acetate were added to 45 milliliters of N,N-dimethylacetamide containing approximately 0.05 gram of titanium dioxide. The mixture was stirred and heated for 35 minutes at 70° C. It was then quickly cooled to room temperature and the color measured. This sample was used as a control. The purity is set forth below. Subsequently, like samples were prepared but with 0.150 gram of a color inhibitor containing 0.075 gram each of zinc formaldehyde sulfoxylate and benzene phosphonous acid; and 0.150 gram of a color inhibitor containing 0.075 gram each of zinc formaldehyde sulfoxylate and benzene phosphonic acid. The purity is set forth below.

Table II

| Inhibitor | Percentage used | Purity |
| --- | --- | --- |
| Control | | 10.2 |
| Zinc formaldehyde sulfoxylate and benzene phosphonous acid | 2 | 4.1 |
| Zinc formaldehyde sulfoxylate and benzene phosphonic acid | 2 | 3.8 |

EXAMPLE III 7.5 grams of an acrylonitrile homopolymer were added to 45 milliliters of N,N-dimethylacetamide containing approximately 0.05 gram of titanium dioxide. The mixture was stirred and heated for 50 minutes at 90° C. It was then quickly cooled to room temperature and the color measured. This sample was used as a control. The purity of the control sample is set forth below. Subsequently, like samples were prepared but with 0.150 gram of a color inhibitor containing 0.075 gram each of zinc formaldehyde sulfoxylate and benzene phosphonous acid; and 0.150 gram of a color inhibitor containing 0.075 gram each of zinc formaldehyde sulfoxylate and benzene phosphonic acid. The purity is set forth below.

Table III

| Inhibitor | Percentage used | Purity |
| --- | --- | --- |
| Control | | 10.8 |
| Zinc formaldehyde sulfoxylate and benzene phosphonous acid | 2 | 2.5 |
| Zinc formaldehyde sulfoxylate and benzene phosphonic acid | 2 | 2.0 |

The tests for color indicative of approaching whiteness used throughout the examples consist of measurements of purity as calculated from the tristimulus values determined on a General Electric spectrophotometer by the methods recommended by the Standard Observer and Coordinate System of the International Commission on Illumination, as fully set forth in the Handbook of Colorimetry published by The Technology Press, Massachusetts Institute of Technology in 1936.

The compositions of the instant invention present many advantages. For example, products formed from the polymer solutions of the instant invention are free of objectionable color and therefore of greater commercial value. In preparing the polymer solutions, heat may be applied without the danger of color formation and the solutions, if necessary, may stand for prolonged periods and remain free of color. The inhibiting agents are readily available and inexpensive. Therefore, no great increase in production cost is necessary. The compositions containing the inhibitors may be prepared without going through detailed and elaborate procedures that necessitate expensive changes in the design of the apparatus used to manufacture them.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

We claim:

1. A new composition of matter comprising a polymer containing at least 80 percent of polymerized acrylonitrile and up to 20 percent of another polymerizable mono-olefinic monomer copolymerizable therewith, a solvent therefor, and an inhibiting agent comprising a compound having the general formula,

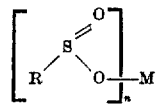

wherein R is an alkanol group containing 1 to 3 carbon atoms and having the free valence on a carbon atom joined to the hydroxy group, $n$ is an integer from 1 to 2, and M is a metal selected from the group consisting of sodium, potassium and zinc; and a compound selected from the group consisting of benzene phosphonous acid and benzene phosphonic acid.

2. A new composition of matter as defined in claim 1 wherein the polymer is a copolymer containing from 80 to 98 percent of acrylonitrile and from 2 to 20 percent of another polymerizable mono-olefinic monomer copolymerizable therewith.

3. A new composition of matter as defined in claim 1 wherein the polymer is a blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinyl pyridine.

4. A new composition of matter as defined in claim 1 wherein the polymer is polyacrylonitrile.

5. A new composition of matter as defined in claim 1 wherein the compound is sodium formaldehyde sulfoxylate.

6. A new composition of matter as defined in claim 1 wherein the compound is potassium formaldehyde sulfoxylate.

7. A new composition of matter as defined in claim 1 wherein the compound is zinc formaldehyde sulfoxylate.

8. A new composition of matter as defined in claim 1 wherein the inhibiting agent contains benzene phosphonous acid.

9. A new composition of matter as defined in claim 1 wherein the inhibiting agent contains benzene phosphonic acid.

10. A new composition of matter comprising a polymer blend of (A) a copolymer containing 90 to 98 percent of acrylonitrile and 2 to 10 percent of another polymerizable monoolefinic monomer and (B) a copolymer containing 10 to 70 percent of acrylonitrile and 30 to 90 percent of a vinyl-substituted tertiary heterocyclic amine, said blend having an overall vinyl-substituted tertiary heterocyclic amine content of from 2 to 10 percent based on the weight of the blend, a solvent therefor, and an inhibiting agent comprising a compound having the general formula,

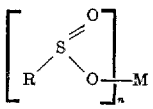

wherein R is an alkanol group containing 1 to 3 carbon atoms and having the free valence on a carbon atom joined to the hydoxy group, $n$ is an integer from 1 to 2, and M is a metal selected from the group consisting of sodium, potassium and zinc; and a compound selected from the group consisting of benzene phosphonous acid and benzene phosphonic acid.

11. A new composition of matter comprising a copolymer containing 80 to 98 percent of acrylonitrile and 2 to 20 percent of vinyl acetate, a solvent therefor, and 0.3 to 15 percent, based on the total weight of the polymer, of an inhibiting agent, said inhibiting agent comprising a compound having the general formula,

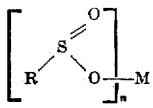

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid.

12. A new composition of matter comprising a polymer blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinylpyridine, a solvent therefor, and 0.3 to 15 percent, based on the total weight of the polymer, of an inhibiting agent, said inhibiting agent comprising a compound having the general formula,

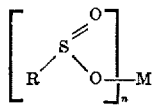

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid.

13. A new composition of matter comprising a polymer containing at least 80 percent of polymerized acrylonitrile and up to 20 percent of another polymerizable mono-olefinic monomer copolymerizable therewith, a solvent therefor, and 0.3 to 15 percent, based on the total weight of the polymer, of an inhibiting agent, said inhibiting agent comprising a compound having the general formula,

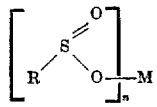

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid.

14. A new composition of matter comprising a copolymer containing 80 to 98 percent of acrylonitrile and 2 to 20 percent of vinyl acetate, a solvent therefor, and 0.3 to 15 percent, based on the total weight of the polymer, of an inhibiting agent, said inhibiting agent comprising a compound having the general formula,

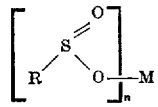

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid, each one of the components of said inhibiting agent being employed in a range of 1 to 98 percent, based on the total weight of said inhibiting agent, the components of said inhibiting agent totaling 100 percent.

15. A new composition of matter comprising a polymer blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinylpyridine, a solvent therefor, and 0.3 to 15 percent, based on the total weight of the polymer, of an inhibiting agent, said inhibiting agent comprising a compound having the general formula,

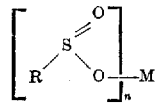

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid, each one of the components of said inhibiting agent being employed in a range of 1 to 98 percent, based on the total weight of said inhibiting agent, the components of said inhibiting agent totaling 100 percent.

16. A new composition of matter comprising polyacrylonitrile, a solvent therefor, and 0.3 to 15 percent, based on the total weight of the polymer, of an inhibiting agent, said inhibiting agent comprising a compound having the general formula,

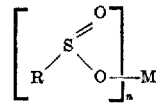

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid, each one of the components of said inhibiting agent being employed in a range of 1 to 98 percent, based on the total weight of said inhibiting agent, the components of said inhibiting agent totaling 100 percent.

17. A method for preparing a new composition of matter comprising mixing a polymer containing at least 80 percent of polymerized acrylonitrile and up to 20 percent of another polymerizable mono-olefinic monomer copolymerizable therewith, a solvent therefor, and an inhibiting agent comprising a compound having the general formula,

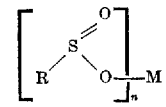

wherein R is an alkanol group containing 1 to 3 carbon atoms and having the free valence on a carbon atom joined to the hydroxy group, n is an integer from 1 to 2, and M is a metal selected from the group consisting of sodium, potassium and zinc; and a compound selected from the group consisting of benzene phosphonous acid and benzene phosphonic acid, and heating the mixture to form a homogeneous solution.

18. The method as defined in claim 17 wherein the polymer is a copolymer containing from 80 to 98 percent of acrylonitrile and from 2 to 20 percent of another polymerizable mono-olefinic monomer copolymerizable therewith.

19. The method as defined in claim 17 wherein the polymer is a blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinyl pyridine.

20. A method for preparing a new composition of matter comprising mixing a polymer blend of 80 to 99 percent of (A) a copoylmer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinyl pyridine, N,N-dimethylacetamide, and 0.3 to 15 percent, based on the total weight of the polymer, of an inhibiting agent, said inhibiting agent containing zinc formaldehyde sulfoxylate and benzene phosphonic acid, each one of the components of said inhibiting agent being employed in a range of 1 to 99 percent, based on the total weight of said inhibiting agent, the components of said inhibiting agent totaling 100 percent; and heating the mixture to a temperature in a range of 25° C. to the boiling point of said mixture to form a homogeneous solution.

References Cited in the file of this patent
UNITED STATES PATENTS 2,642,408     Stanin et al. _____ June 16, 1953

FOREIGN PATENTS 1,027,445     France _____ May 12, 1953